Aug. 18, 1936.　　G. W. CRANDALL　　2,051,028
PRESSURE REGULATOR
Filed June 9, 1933　　2 Sheets-Sheet 1

INVENTOR
GEORGE W. CRANDALL
BY Cox + Moore
ATT'YS.

Aug. 18, 1936.  G. W. CRANDALL  2,051,028
PRESSURE REGULATOR
Filed June 9, 1933  2 Sheets-Sheet 2

INVENTOR
GEORGE W. CRANDALL
BY Cox & Moore
ATT'YS

Patented Aug. 18, 1936

2,051,028

UNITED STATES PATENT OFFICE 2,051,028

PRESSURE REGULATOR

George W. Crandall, Itasca, Ill., assignor to Charles E. Swann, Chicago, Ill.

Application June 9, 1933, Serial No. 675,064

4 Claims. (Cl. 50—5)

The present invention relates to automatic pressure regulation for fluids such as air, water, steam, etc., and in the present application is shown applied to an air pressure regulating means used for inflating automobile tires, or for supplying air under pressure to tanks, machinery, or the like.

Another object of this invention is to provide a pressure gauge in which there is included a pressure-actuated diaphragm which controls the movement of the valve, which in turn controls the flow of air to be supplied from a pressure tank to the tire or other device to which the air is to be supplied. This diaphragm is normally held open by a loading device provided with safety means for preventing an over-load on the pressure diaphragm.

Another object of this invention is to provide means for regulating the amount of air supplied to a tire or like device by controlling the flow of air by a pressure-actuated valve which has pressure means associated therewith connected directly to the indicating means which indicates the desired pressure to be obtained, whereby upon seating the indicating means, the load on the valve is properly adjusted.

Another object of this invention is to provide means for obtaining a direct uncontrolled flow of air through the gauge from the pressure tank when it is desired to use the full tank pressure which may exceed greatly the indicated capacity for the gauge. It is sometimes desirable to use such pressure, and in the present instance, a slightly extended movement of the indicating means on the gauge beyond the normal movement thereof enables one to obtain the full tank pressure through the air line and gauge.

More specifically the means for obtaining the full tank pressure includes means for preventing the pressure-actuating valve from closing.

Another object of this invention is to provide an efficient air cleaning mechanism for cleaning the air delivered through the air line and gauge, the same being provided with means for removing foreign particles from the air cleaning mechanism by the air from the pressure tank.

Another object of this invention is to provide the valve which opens and closes the passage through the air gauge with a portion shaped to cooperate with a tool which is used for the purpose of actuating the valve and cleaning the same. In the present instance, this is accomplished by rotating the valve which is of the poppet type. The valve is made accessible for this purpose by removing a screw in alignment with the valve stem, and the opening in which the screw is threaded is of a sufficient size to permit the operator to insert a screw driver or the like through the opening to actuate the valve without dismantling the valve.

Another object of this invention is to provide safety means for protecting the diaphragm which controls the valve whenever the air line is broken or when a leak in the same is suddenly developed.

Other objects of this invention will appear hereinafter as the description thereof proceeds, the novel features, arrangements, and combinations being clearly set forth in the appended claims:

Figure 1:
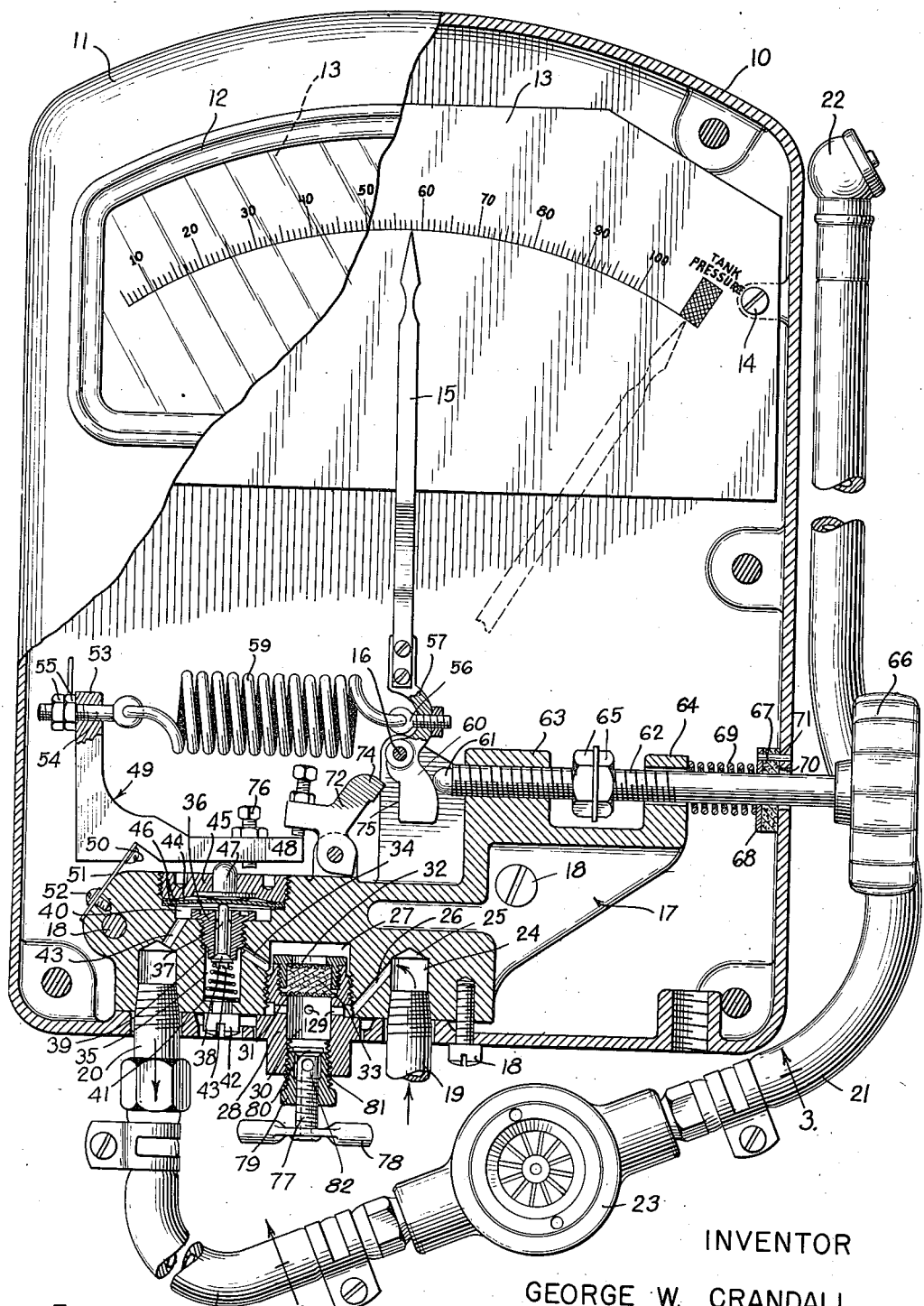
Fig. 1 is a front elevational view of a pressure gauge constructed according to my invention with parts broken away and in section for the sake of clearness.

The reference numeral 10 indicates the casing for the pressure gauge and 11 indicates the cover therefor having a transparent glass panel 12 through which the scale 13 is visible, the scale 13 being mounted inside the casing and held in place by screws 14. The scale is provided with suitable graduations indicating desired air pressures in pounds per square inch and with a designation indicated at the right as "Tank pressure". Cooperating with the scale 13 is an indicating pointer 15 pivotally mounted at 16 to a main body member designated generally as 17, which member is secured in any suitable manner to the casing as by screws 18. The main body member in the present instance is shown as a casting but may be constructed by forging, die casting, or in any other suitable manner. When the pointer is moved to the dotted line position shown in Fig. 1 to point to the indication which indicates tank pressure, the entire tank pressure may be used as there is an unrestricted flow through the pressure gauge as will be apparent as the description proceeds.

Threaded into the member 17 is an inlet tube 19 and an outlet tube 20. The inlet tube 19 is connected to a pressure tank in which the air is stored under pressure in excess of that required. The outlet tube 20 is connected in the usual manner to an air hose 21 having a chuck 22 and a flow indicator 23, the latter being interposed between the outlet 20 and the chuck 22. The chuck 22 can be of any desired construction.

The air enters a chamber 24 and strikes against the upper conical wall 25 thereof and is deflected into the downwardly extending passage 26 which communicates with the air cleaning chamber 27. In this air cleaning chamber there is threaded a bushing 28 having radial passages 29 and a vertical bore 30. Over the upper end of the vertical bore is arranged three layers of filtering material. The bottom and top layers 31 and 32 are fine screens and the interposed layer 33 is fibrous material such as wool, felt, or the like. The air passes downwardly through the passage 26, enters the chamber 27 through the radial passages 29, screen 31, fibrous cleaning material 33, and screen 32, and then passes upwardly through a passage 34 into a vertical bore 35. Threaded into the upper end of this bore is a plug 36 having a central bore in which the stem 37 of the valve 38 slides, the bore being provided with parallel grooves 39 which permit the passage of the air through the plug 36 to the chamber 40. The valve 38 has a seat thereon surrounding the lower end of the bore in which the stem 37 is slidable for cutting off communication between the chamber 35 and chamber 40 when the valve is in its uppermost position in which it is held by the spring 41 abutting against the lower end wall of the chamber 35. The lower end wall of the chamber 35 is closed by a screw 42 which is removable to permit access to the valve 38 which has a slotted head 43, the slot in said head being adapted to receive a screw driver inserted through the opening in the lower end wall of chamber 35 when the screw 42 is removed. The screw driver can be used to rotate the valve and clean the seat of any small particles of foreign matter if the same become lodged between the valve and the seat. The air entering the chamber 40 passes downwardly through the passage 43 into the outlet tube 20. The upper end of the chamber 40 is closed by a diaphragm 44 held in place by a valve chamber cover 45 threaded into the casting 17. Washers 46 are arranged on opposite sides of the diaphragm to provide a peripheral seal about the edge of the diaphragm which is made in the form of a circular disk.

Extending upwardly through the valve chamber cover is a diaphragm button 47 which rests on the upper side of the diaphragm and has a lower substantially spherical surface in order that the pressure will always be applied substantially centrally of the diaphragm.

The upper end of the button 47 contacts with an end 48 of a pivoted lever designated generally as 49 which is secured by a screw 50 to one end of a spring 51, the other end of the spring being secured by a screw 52 to the member 17. The spring 51 acts as a hinge for the lever 49. The other arm 53 of the lever 49 extends upwardly and an eye-bolt 54 extends therethrough and can be adjusted with respect to the arm 53 by means of adjusting nuts 55. A similar eye-bolt 56 is threaded through an arcuately bent portion 57 of the pointer 15 and is held in place thereon by the lock nut 58. The center of the eye of the eye bolt 56 is substantially in alignment with a line drawn through the pivot 16 and the center line of the pointer 15. The spring 59 has one free end thereof extending through the eye on the eye-bolt 54 and the other extending through the eye on the eye-bolt 56. Formed integrally with the arcuate portion 57 of the pointer and extending below the pivot 16 is a cam-shaped portion 60, the surface of which engages the end 61 of an operating screw 62 threaded into the portion 63 of the member 17, and guided by the bearing 64 also formed on the casting. Lock nuts 65 limit the longitudinal movement of the operating screw 62. An operating knob 66 exterior of the casing 10 is used to rotate the operating screw 62 and advance or retard the end 61 thereof. This causes the pointer to change its position with reference to the scale 13 and the lock nuts 65 are so arranged that the permissible longitudinal adjustment for the operating screw 62 will not extend beyond the limits of the scale so that the end of the pointer will not engage portions of the casing and be bent, and thus make the pointer thereafter indicate the wrong pressures. The surface of the cam-shaped portion 60 is long enough so that the end of the screw will always contact with a portion of said surface regardless of the position of the pointer.

In order to protect the parts of the gauge within the casing, I provide a felt washer 67 surrounding the operating screw 62 and a metal disk 68 which abuts against the felt washer 67 and is urged to the right by means of a spring 69 so that dirt and water will not pass into the casing through the opening 70 through which the actuating screw extends. A driving pin 71 extends through the washer 68, washer 67, and an opening in the casing 10 to prevent the washers 68 and 67 from rotating when the screw 62 is actuated.

It will be noted that the position of the pointer 15 and not the position of the screw 62 controls the pressure on the spring 59. Therefore, if wear occurs between the cam 60 and the end 61 of the operating screw 62 or in the threads of the screw itself, or the threads for the screw in the casting, the tension of the spring is not affected. All that is necessary is that the actuating screw be operated more than was previously necessary in order to bring the pointer to the correct indication on the scale. This is extremely important as it eliminates errors common to gauges of this type in which wear in the adjusting or dial setting mechanism varies the accuracy of the instrument.

Whenever it is desired to use the full pressure in the pressure tank, I provide means for giving the pointer 15 an extended movement to the dotted line position shown in Fig. 1, which dotted line position indicates tank pressure as is clearly shown in the drawings. The full line position for the parts when the pointer is in this position is clearly illustrated in Fig. 2.

Figure 2:
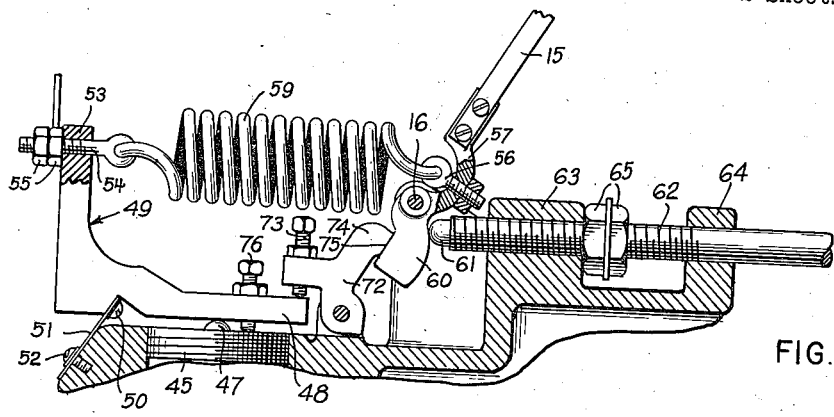
Fig. 2 is a fragmentary view of the parts shown in Fig. 1 illustrating another position of those parts.

Pivoted to the member 17 is a bell crank lever 72 in one arm of which there is threaded an adjusting screw 73, the other arm 74 being adapted to contact with the face 75 on the cam 60 when the pointer 15 is moved to the position where it indicates full tank pressure as clearly illustrated in Fig. 2. The end of the adjusting screw 73 is adapted to contact with the free end of the arm 48 and in doing so presses the arm 48 downwardly to depress the button 47 and open the valve 38. Thus the valve is held open by a positive action and cannot close while the parts are in the position shown in Fig. 2. The result is that the full pressure in the tank may be utilized when desired. The arm 48 also carries an adjustable limiting stop 76, the lower end of which is adapted to contact with the upper side of the lug 45 when the valve 38 is open to prevent the full pressure of the spring 59 or the adjusting screw 73, which ever happens to be operative to hold the valve open, from being transmitted to the diaphragm. This protects the diaphragm against any abuse or functioning beyond normal limits and enables a more sensitive type of diaphragm to be used. It will be understood that the adjustable stop 76 is operative to limit the movement of the arm 48 under the influence of the spring 59 as well as to limit the movement of the arm 48 when actuated by the bell crank 72.

The air cleaner is provided with a drain valve at the lower end thereof which drain valve comprises a hollow threaded stud 77 provided with an operating handle 78 which is threaded in a supplementary bushing 79 threaded into the bushing 28. The end of the stud 77 has a valve head 80 adapted to seat against a seat formed at the upper end of the bushing 79. Surrounding the stud 77 just below the valve head 80 is a peripheral chamber 81 which is cut off from communication with the chamber 30 by means of the valve head when the valve is in the position shown in Fig. 1. A transverse opening 82 in the hollow stud 77 communicates with the chamber 81 and the interior of the hollow stud so that when the valve 79 is raised off its seat, air can flow from the chamber 30 into the chamber 81 and from there into the opening 82 and hollow stud into the atmosphere. Thus upon opening the valve, the pressure in the pressure tank may be utilized to blow out foreign matter which has accumulated in the bottom of the air cleaning chamber and to drive out any particles of oil or moisture that may accumulate therein.

Other features of the air cleaning apparatus are that when the air strikes the conical end 25 of the chamber 24, solid particles tend to drop back into the air line or be slowed up in their motion and gravitate through the passage 26 to the bottom of the chamber 30. These particles generally will not come into engagement with the air cleaner proper, but will drop to the bottom of the chamber 30 and be blown out in the manner just described. Other foreign matter is taken out of the air by the air cleaner comprising the screens 31 and 32, and fibrous material 33. If there is any foreign matter which passes into the chamber 35 and falls into the bottom of that chamber, it may be removed by removing the screw 42.

It will be noted that air which enters the pressure gauge has a short direct path of movement between the inlet 19 and the outlet 20, and that the pressure control valve and the air cleaning apparatus are all contained in a single member 17 and makes a very compact arrangement. This arrangement does away with a large number of mechanical or moving parts, friction surfaces and joints which have been heretofore used in pressure gauges of this character, and enables the pressure apparatus to be tested before being placed within the casing as it will be noted that all of the essential parts of the gauge are contained within or supported by the member 17, and all pivots, etc., will bear the same relation with respect to each other after the operative parts of the gauge are assembled in the casing. The device is also very rugged and has very few movable parts, thereby eliminating friction and wear which might seriously affect the accurate operation thereof.

Figure 3:
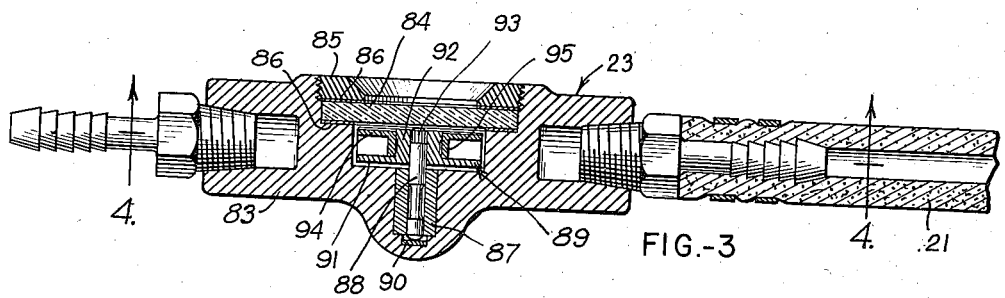
Fig. 3 is a cross-section taken substantially along the line 3—3 of Fig. 1.
Figure 4:
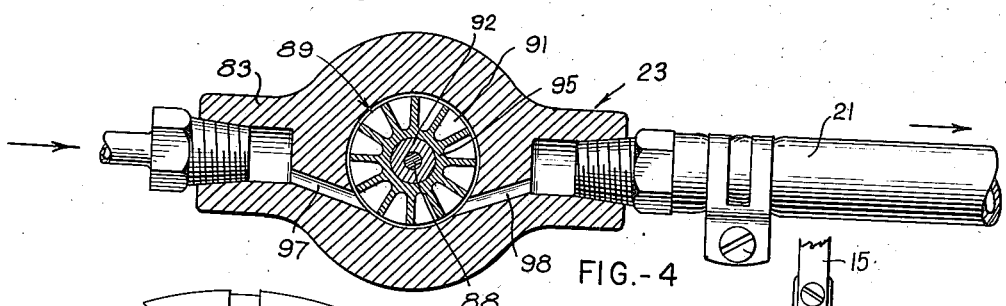
Fig. 4 is a cross-section taken substantially along the line 4—4 of Fig. 3.
Figure 5:
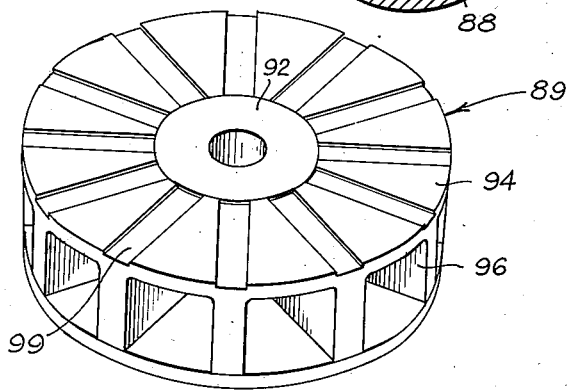
Fig. 5 is a perspective view of the revolving wheel shown in Figs. 3 and 4.

The flow indicator 23 is best illustrated in Figs. 3, 4, and 5. It comprises a casing 83 having an opening at the upper side thereof as viewed in Fig. 3 with a glass window 84 covering the opening and held in place by a ring 85 threaded into the casing 83, rubber gaskets 86 being used to prevent leakage of air past the glass window 84. A bushing 87 arranged within the casing rotatably supports the pivot 88 for the rotatable member indicated generally by the reference character 89. The pivot 88 has the opposite ends thereof spherical in shape and the lower end thereof contacts with the thrust bearing 90. The rotatable member 89 is composed of two parts, the lower part 91 of which has a central hub portion 92 which is pressed onto the knurled upper end 93 of the pivot 88, and the upper portion of which comprises a disk member 94 having a hub portion 95 pressed onto the hub 92, the peripheral portion of which is knurled. Depending from the disk 94, are a plurality of vanes 96 which extend into contact with the lower part 91 of the rotatable member 89 to form a sort of paddle wheel, against the vanes of which there is directed a current of air whenever there is air flowing through the hose 21. The air passing through the hose 21 is flowing in the direction of the arrows in Figs. 3 and 4, and in passing through the casing 83, flows through the angular passages 97 and 98 arranged as illustrated in Fig. 4 to direct the air against the outer peripheral edges of the vanes 96 to cause rotation of the rotatable member 89. The upper surface of the disk 94 is provided with a plurality of grooves 99. Thus the upper surface is formed with alternately raised and depressed portions extending peripherally about the disk and these are generally painted different contrasting colors in order that one looking through the window 84 may tell when the rotatable member 89 is rotating. This device is very sensitive and responds to a very small flow of air through the hose 21 and therefore if there is any appreciable amount of air passing through the hose, the member 89 will rotate.

The device is calibrated after the parts are assembled so that at the instant the rotatable member 89 ceases to rotate, the pressure indicated by the pointer 15 will be in the tire being inflated. Therefore, if the operator removes the chuck 22 from the tire valve as soon as the rotatable member 89 ceases to rotate, he will have the desired pressure in the tire.

Figure 6:
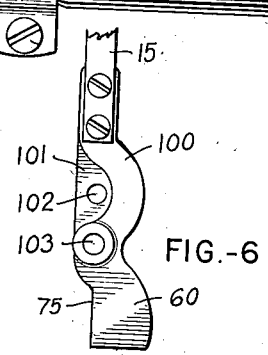
Fig. 6 shows a modification of the indicating pointer illustrated in Figs. 1 and 2.

In Fig. 6, I have indicated a modification of the pointer construction shown in Fig. 1. In this modification, the arcuate portion 100 corresponds to the arcuate portion 57 shown in Fig. 1, but instead of using an adjustable screw 56, I form a web 101 with an opening 102 therethrough which is in alignment with the pivot 103 thereof and the end of the pointer. The opening 102 is for the purpose of receiving the end of the spring 59.

It will be noted from an inspection of Fig. 1 that the right hand end of the spring 59 has a slight arcuate movement about the pivot 16 but due to the fact that the connection between the end of the spring and the eye-bolt 56 is very close to and directly above the pivot 16, at the mid position of the pointer 15, the arcuate path of travel does not diverge appreciably from a horizontal line through the axis of the spring during the movement of the pointer 15 from one end of the scale to the other. The result is that the calibration of the scale 13 can be made with uniform spacing.

Obviously those skilled in the art to which this invention pertains may make various changes in the particular construction and arrangement of parts without departing from the spirit of this invention, and therefore I do not wish to be limited except as hereinafter set forth in the appended claims.

Having thus fully described my invention, what I claim as new and desire to obtain by Letters Patent is:

1. A pressure gauge comprising a member having an air passage therethrough, a valve within said air passage for controlling the same, a diaphragm forming a portion of the wall of said passage and directly connected thereto for opening said valve when pressure is exerted on said diaphragm in one direction, means for exerting pressure on said diaphragm in said last mentioned direction comprising a pivoted lever, a connection between said pivoted lever and diaphragm, pressure means for exerting a pressure on said lever in a direction to operate said diaphragm, a stop on said lever for limiting the amount of movement thereof, and consequently of said diaphragm, an indicating member cooperating with a graduated scale for indicating various degrees of pressure on said lever including those pressures in excess of that required to bring said lever into the position where its motion is arrested by said stop, said indicating means directly actuating the pressure means which exerts pressure on said lever, a pivoted arm having means thereon for moving said lever in a direction to open said valve, and means on said indicating means for engaging and positively rocking said arm about its pivot into said last mentioned position when said indicating means is moved to a predetermined position of adjustment, whereby said valve is positively held in open position against closing movement while said indicating means is at said last mentioned position.

2. A device as set forth in claim 1 in which said indicating means comprises a movable pointer having a tail-piece thereon for engaging a member on said pivoted arm to rock said arm after said indicating means is moved to said predetermined position of adjustment.

3. In a device of the class described, the combination with a member having an air passage therethrough, a diaphragm forming one wall of said passage, a valve for controlling said passage and located adjacent said diaphragm and actuated positively thereby, a pivoted bell crank having one arm engaging means on said diaphragm, a movable indicating pointer, a spring connected at its opposite ends to said pointer and to the other arm of said bell crank, respectively, for moving said first arm in a direction to actuate said valve, a pivoted member normally inoperative but having a portion above said first arm of said bell crank and a second portion adapted to be engaged and moved by means on said pointer at certain positions thereof to actuate said first portion in a direction to cause the same to engage and move said first arm into a position where full closing of said valve is prevented.

4. A pressure gauge comprising a member having an air passage therethrough, a valve for controlling said air passage, a diaphragm forming a wall of said passage and directly connected to said valve for opening the same when pressure is exerted on said diaphragm in one direction, means for exerting pressure on said diaphragm in said last mentioned direction, comprising a pivoted lever, a connection between said pivoted lever and diaphragm, pressure means for exerting a pressure on said lever in a direction to operate said diaphragm, an indicating member cooperating with a graduated scale for indicating various degrees of pressure on said lever, a pivoted arm having means thereon for moving said lever in a direction to open said valve, and means on said indicating means for engaging and positively rocking said arm about its pivot into said last mentioned position when said indicating means is moved to a predetermined position of adjustment, whereby said valve is positively held in open position against closing movement while said indicating means is at said last mentioned position.

GEORGE W. CRANDALL.